US008903363B2

(12) United States Patent
Aaron et al.

(10) Patent No.: US 8,903,363 B2
(45) Date of Patent: Dec. 2, 2014

(54) DETERMINING AN AVAILABILITY STATUS OF A CONTACT BEING CALLED (75) Inventors: Thomas A. Aaron, Pflugerville, TX (US); Anil Kalavakolanu, Austin, TX (US); Loulwa Salem, Austin, TX (US); Stephen A. Schlachter, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 13/195,661

(22) Filed: Aug. 1, 2011

(65) Prior Publication Data

US 2013/0035076 A1 Feb. 7, 2013

(51) Int. Cl.
*H04M 3/42* (2006.01)
*G06Q 50/00* (2012.01)
*G06Q 10/10* (2012.01)
*H04L 29/08* (2006.01)

(52) U.S. Cl.
CPC .............. *G06Q 10/109* (2013.01); *G06Q 50/01* (2013.01); *H04M 3/42093* (2013.01); *H04M 2203/655* (2013.01); *H04M 3/42365* (2013.01); *H04L 67/24* (2013.01)
USPC ........................................ 455/414.1; 455/416

(58) Field of Classification Search
CPC ....... H04L 67/26; H04L 67/22; H04L 67/306; H04L 51/04; H04L 51/32; H04L 67/24; H04L 12/588; G06F 17/30029; Y10S 707/99933; Y10S 707/99943
USPC ........ 455/416, 417, 412.1, 412.2, 432.3, 461, 455/406, 88.22, 202.01, 87; 705/14.71, 705/14.46, 14.43, 14.49, 14.66, 14.64, 705/14.23, 14.45, 14.52
See application file for complete search history.

(56) References Cited

U.S. PATENT DOCUMENTS

| 6,751,483 | B1 | 6/2004 | Oh |
| 7,330,720 | B2 | 2/2008 | Hinz |
| 7,474,744 | B2 | 1/2009 | Janssen |
| 7,822,647 | B1* | 10/2010 | Mussman et al. ............ 705/26.1 |
| 8,374,628 | B1 | 2/2013 | Nelissen et al. |
| 2004/0204002 | A1 | 10/2004 | Chen et al. |
| 2005/0175172 | A1 | 8/2005 | Janssen |
| 2006/0104428 | A1 | 5/2006 | Jin |
| 2007/0160076 | A1* | 7/2007 | Faber et al. .................... 370/461 |
| 2008/0148154 | A1* | 6/2008 | Burrell et al. ................. 715/733 |
| 2008/0172243 | A1* | 7/2008 | Kelly ................................. 705/1 |

(Continued)

OTHER PUBLICATIONS

U.S. Appl. No. 13/195,565, entitled "Determining Local Time in a Location of a Telephone," filed Aug. 1, 2011.

(Continued)

*Primary Examiner* — Dwayne Bost
*Assistant Examiner* — Scott Trandai
(74) *Attorney, Agent, or Firm* — Mark Christopher Vallone; Maeve L. McCarthy (57) ABSTRACT In a method for placing a telephone call, a telephone receives a request to call a contact. The telephone retrieves a user preference for obtaining an availability status of the contact. The telephone obtains the availability status of the contact from one of a plurality of sources based at least in part on an order of priority of the sources defined by the user preference. The sources include a social network program. The telephone displays the status of the contact. The telephone prompts for a decision whether to place the call to the contact.

8 Claims, 5 Drawing Sheets

(56) References Cited

U.S. PATENT DOCUMENTS

| | | | |
|---|---|---|---|
| 2008/0214149 A1* | 9/2008 | Ramer et al. | 455/414.1 |
| 2008/0214152 A1* | 9/2008 | Ramer et al. | 455/414.1 |
| 2008/0214155 A1* | 9/2008 | Ramer et al. | 455/414.1 |
| 2008/0214156 A1* | 9/2008 | Ramer et al. | 455/414.1 |
| 2008/0214157 A1* | 9/2008 | Ramer et al. | 455/414.1 |
| 2008/0214162 A1* | 9/2008 | Ramer et al. | 455/414.2 |
| 2008/0215428 A1* | 9/2008 | Ramer et al. | 705/14 |
| 2008/0242279 A1* | 10/2008 | Ramer et al. | 455/414.2 |
| 2008/0275785 A1* | 11/2008 | Altberg et al. | 705/14 |
| 2009/0080635 A1* | 3/2009 | Altberg et al. | 379/216.01 |
| 2009/0274287 A1 | 11/2009 | Al-Duwaish | |
| 2009/0327432 A1* | 12/2009 | Augustine et al. | 709/206 |
| 2010/0159909 A1* | 6/2010 | Stifelman | 455/418 |
| 2010/0159942 A1 | 6/2010 | Lewis et al. | |
| 2010/0246787 A1 | 9/2010 | Ray | |
| 2010/0254525 A1* | 10/2010 | Maly et al. | 379/207.03 |
| 2010/0312848 A1* | 12/2010 | Bakshi et al. | 709/207 |
| 2011/0069661 A1 | 3/2011 | Waytena et al. | |
| 2011/0088003 A1* | 4/2011 | Swink et al. | 715/863 |
| 2011/0117878 A1* | 5/2011 | Barash et al. | 455/404.2 |
| 2011/0130168 A1* | 6/2011 | Vendrow et al. | 455/556.1 |
| 2011/0268262 A1* | 11/2011 | Jones et al. | 379/202.01 |
| 2011/0268263 A1* | 11/2011 | Jones et al. | 379/202.01 |
| 2011/0298618 A1 | 12/2011 | Stahl et al. | |
| 2012/0003989 A1* | 1/2012 | Gravino | 455/456.1 |
| 2013/0034221 A1 | 2/2013 | Aaron et al. | |

OTHER PUBLICATIONS

Preliminary Amendment filed Sep. 12, 2011 for U.S. Appl. No. 13/195,565, entitled "Determining Local Time in a Location of a Telephone."

LBS Insight. "Disney Mobile's new Family Locator service will be powered by Autodesk's LocationLogic platform." Published May 17, 2006. Viktoriagatan 3, 411 25 Gothenburg, Sweden. <http://www.lbsinsight.com/?id=437>.

DNC Solutions. "Regulatory Information: Regulatory Charts." Published Mar. 9, 2010. <http://www3.dncsolution.com/marketing/reginfo/reginfo2.asp>.

Dial Connection. "DPTS Frequently Asked Questions." Date printed May 4, 2011 <http://www.dialconnection.com/products/dpts/faq.asp>.

International Calling Codes and World Time Zones. "Country Calling Codes, International Calling Made Easy! ". Content Copyright 2000-2010 Domain-it! Date printed May 4, 2011 <http://countrycallingcodes.com/>.

"Convert USA + Canada phone codes to time zones." Date printed May 4, 2011 <http://wwp.areacodetime.com/>.

Wikipedia. "Local conventions for writing telephone numbers." Date printed May 5, 2011 <http://en.wikipedia.org/wiki/Local_conventions_for_writing_telephone_numbers>.

Commercial Systems Corporation. "Area Code Lookup—Look up Area Codes by City or State." Date printed May 5, 011 <http://www.areacodes.org/>.

"Area Code Lookup," Date printed Feb. 3, 2011 <http://www.area-code-lookup.info/>.

"iPhone Apps—Area Code Info." Date printed Feb. 3, 2011 <http://www.apptism.com/apps/map-it-area-codes-by-time-zone>.

Beaumont, C., "Sniff: Social Network Integrated Friend Finder—Telegraph" The Telegraph. Jun. 13, 2008. © Copyright of Telegraph Media Group Limited 2013. <http://www.telegraph.co.uk/technology/3357568/Sniff-Social-Network-Integrated-Friend-Finder.html>.

"Location-based service—Wikipedia, the free encyclopedia." Wikipedia The Free Encyclopedia. Mar. 15, 2013. <http://en.wikipedia.org/wiki/Location-based_service>.

Non-final Office Action for U.S. Appl. No. 13/195,565, dated Jan. 23, 2013.

Response to Non-final Office Action for U.S. Appl. No. 13/195,565, dated Jan. 23, 2013, filed Apr. 18, 2013.

"Social network | Define Social network at Dictionary.com." Dictionary.com. Web. Apr. 18, 2013 (date accessed). Copyright 2013 Dictionary.com. <http://dictionary.reference.com/browse/social+network>.

"Social networking service—Wikipedia, the free encyclopedia." Wikipedia The Free Encyclopedia. Apr. 11, 2013. <http://en.wikipedia.org/wiki/Social_networking_service>.

"Social Network Integrated Friend Finder—What does SNIFF stand for? Acronyms and abbreviations by the Free Online Dictionary." The Free Dictionary. Copyright 1988-2008 AcronymFinder.com. Web. Apr. 18, 2013 (date accessed). <http://acronyms.thefreedictionary.com/Social+Network+Integrated+Friend+Finder>.

Final Office Action from Application U.S. Appl. No. 13/195,565 dated Jun. 11, 2013.

Response filed (Aug. 1, 2013) to Final Office Action from U.S. Appl. No. 13/195,565 dated Jun. 11, 2013.

Advisory Action dated Aug. 12, 2013 from U.S. Appl. No. 13/195,565.

Notice of Appeal filed Sep. 4, 2013 from U.S. Appl. No. 13/195,565.

Appeal Brief filed Sep. 10, 2013 from U.S. Appl. No. 13/195,565.

Notice of Allowance dated Nov. 14, 2013 from U.S. Appl. No. 13/195,565.

* cited by examiner

DETERMINING AN AVAILABILITY STATUS OF A CONTACT BEING CALLED

TECHNICAL FIELD

The present invention relates generally to wireless communication and more specifically to determining an availability status of a contact being called.

BACKGROUND

Family, friends, and business contacts are often spread throughout the world, involved in various activities. Placing a telephone call to a contact is a common way of communicating with the contact. A contact may not be willing to accept a telephone call, however, depending on an activity the contact is engaged in during the time of the call. For example, a contact may be in a business meeting and may not want to be disturbed. A contact may turn off his telephone or the ringer on the telephone while in the meeting, although that may prevent callers from reaching the contact in case of an emergency. Further, a contact may not always remember to turn off the telephone or to place the phone in silent mode while in the meeting, where the sound of a ringing phone may be disruptive.

Alternatively, a caller may not wish to disturb a contact if the caller were to know the availability status of the contact. For example, a caller may not want to disturb a contact when the contact is in a business meeting. The caller may decide that the call is not important and may choose to wait until another time to call the contact. A caller may obtain an availability status of a contact from a social network, such as Facebook® and Twitter®, or a location based service (LBS), such as Google Latitude™ and Foursquare®. However, this requires the caller to access the social network or LBS independently of making the telephone call, which is inconvenient for the caller. Additionally, a caller may not remember to first check an availability status of a contact before calling the contact.

SUMMARY

In a first embodiment of the present invention, there is a method for placing a telephone call. A telephone receives a request to call a contact. The telephone retrieves a user preference for obtaining an availability status of the contact. The telephone obtains the availability status of the contact from one of a plurality of sources based at least in part on an order of priority of the sources defined by the user preference. The sources include a social network program. The telephone displays the status of the contact. The telephone prompts for a decision whether to place the call to the contact.

In a second embodiment of the present invention, there is an apparatus for placing a call. The apparatus includes one or more processors, one or more computer-readable memories, and one or more computer-readable tangible storage devices. The apparatus further includes program instructions, stored on at least one of the one or more storage devices for execution by at least one of the one or more processors via at least one of the one or more memories, to receive a request to call a contact. The apparatus further includes program instructions, stored on at least one of the one or more storage devices for execution by at least one of the one or more processors via at least one of the one or more memories, to retrieve a user preference for obtaining an availability status of the contact. The apparatus further includes program instructions, stored on at least one of the one or more storage devices for execution by at least one of the one or more processors via at least one of the one or more memories, to obtain the availability status of the contact from one of a plurality of sources based at least in part on an order of priority of the sources defined by the user preference. The sources include a social network program. The apparatus further includes program instructions, stored on at least one of the one or more storage devices for execution by at least one of the one or more processors via at least one of the one or more memories, to display the availability status of the contact. The apparatus further includes program instructions, stored on at least one of the one or more storage devices for execution by at least one of the one or more processors via at least one of the one or more memories, to prompt for a decision whether to place the call to the contact.

In a third embodiment of the present invention, there is a computer program product for placing a telephone call. The computer program product includes one or more computer-readable tangible storage devices. The computer program product further includes program instructions, stored on at least one of the one or more storage devices, to receive a request to call a contact. The computer program product further includes program instructions, stored on at least one of the one or more storage devices, to retrieve a user preference for obtaining an availability status of the contact. The computer program product further includes program instructions, stored on at least one of the one or more storage devices, to obtain the availability status of the contact from one of a plurality of sources based at least in part on an order of priority of the sources defined by the user preference. The sources include a social network program. The computer program product further includes program instructions, stored on at least one of the one or more storage devices, to display the availability status of the contact. The computer program product further includes program instructions, stored on at least one of the one or more storage devices, to prompt for a decision whether to place the call to the contact.

DETAILED DESCRIPTION

Figure 1:
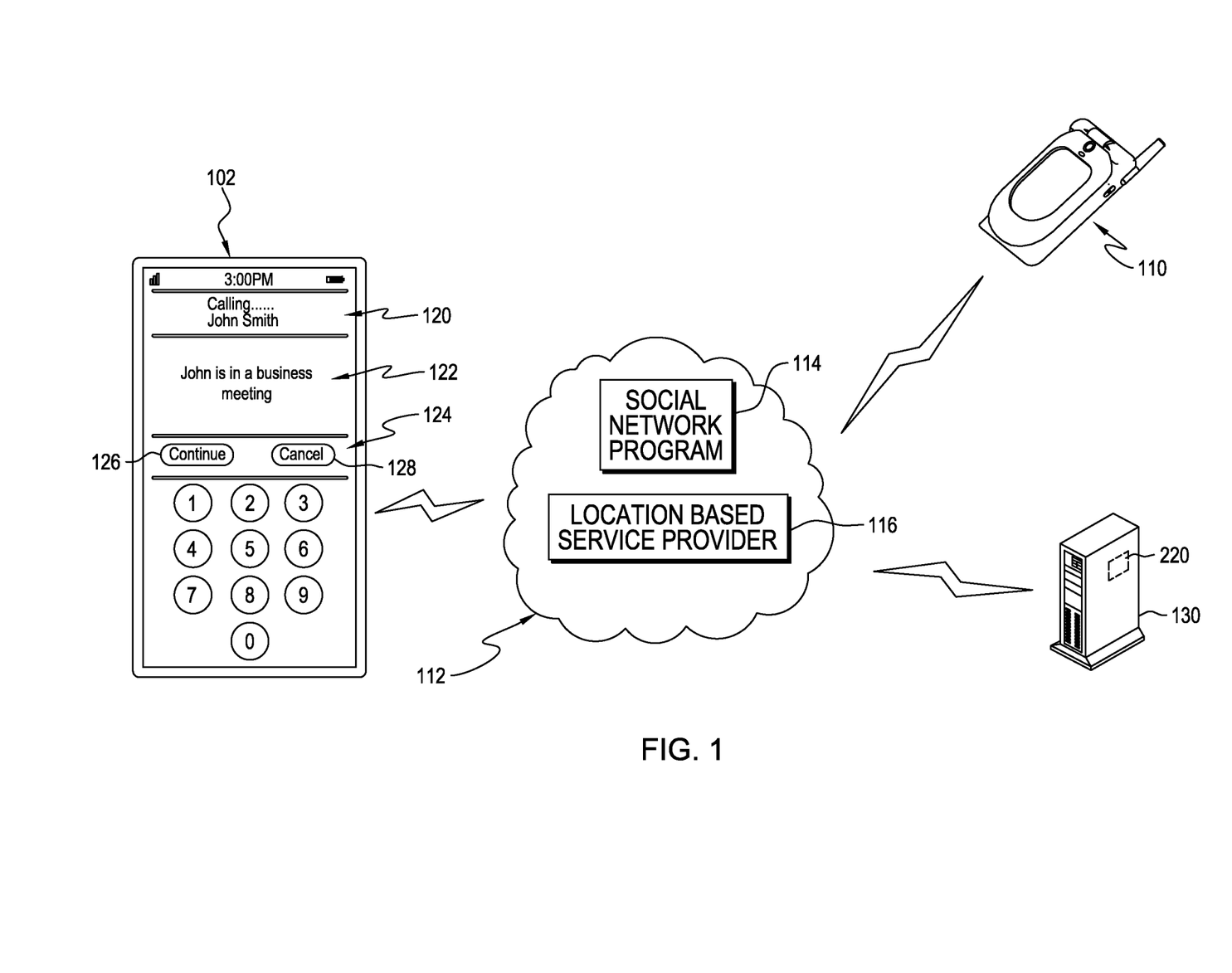
FIG. 1 illustrates a system for determining an availability status of a contact associated with a target telephone when placing a call from a telephone to the target telephone, according to an illustrative embodiment of the invention.

The present invention will now be described with reference to the figures. FIG. 1 illustrates a system for determining an availability status of a contact associated with a target telephone 110 when placing a call from a telephone 102 to target telephone 110. Telephone 102 may be a wireless mobile telephone, a wired telephone, or any other device capable of making telephone calls to a contact. Similarly, target telephone 110 may be a wireless mobile telephone, a wired telephone, or any other device capable of receiving telephone calls.

Telephone 102 has a first display region 120 for displaying the name of the contact being called. Telephone 102 has a second display region 122 for displaying the availability status of the contact being called. For example, second display region 122 may display the text "John is in a business meeting." Second display region 122 may also display a graphic representative of the contact's current availability status, either in the background behind the availability status or in place of the availability status. For example, second display region 122 may display a graphic of a two people talking to indicate to the caller that the contact is in a business meeting. As will be described, an availability status of a contact may be obtained from one of several sources. Thus, in an example embodiment, second display region 122 may display the source or sources of the availability status of the contact, in addition to displaying the availability status.

Telephone 102 has a third display region 124, including a graphic representative of a continue button 126 for enabling the caller to proceed with placing the phone call to target telephone 110 based on information presented to the caller in second display region 122. Third display region 124 also includes a graphic representative of a cancel button 128 for enabling the caller to cancel the call to target telephone 110 based on information presented to the caller in second display region 122. It should be understood that, although continue button 126 and cancel button 128 have been described as being included in display region 124 as graphical representations, continue button 126 and cancel button 128 may also be physical buttons on telephone 102, in an example embodiment.

Telephone 102 is in communication with a social network program 114, such as Facebook® or Twitter®, via a network 112, to retrieve a current availability status of a contact. In the embodiment illustrated in FIG. 1, network 112 is the Internet. However, one of skill in the art will appreciate that, in other embodiments, network 112 can be any type of network, such as a local area network (LAN), a wide area network (WAN), or an Intranet.

Telephone 102 is also in communication with a location based service provider (LBS) 116, such as Google Latitude™ or Foursquare®, via network 112, to retrieve a current availability status of a contact. It should be understood that although the example embodiment illustrates telephone 102 in communication with two sources for retrieving a contact's availability status, telephone 102 may communicate with any number of sources to retrieve a contact's availability status.

A contact status program 220, stored on a computer 130 in communication with telephone 102 via network 112, is for determining an availability status of a call recipient prior to placing a call to the recipient. Contact status program 220 can be downloaded to telephone 102 from computer 130 via network 112.

Figure 2:
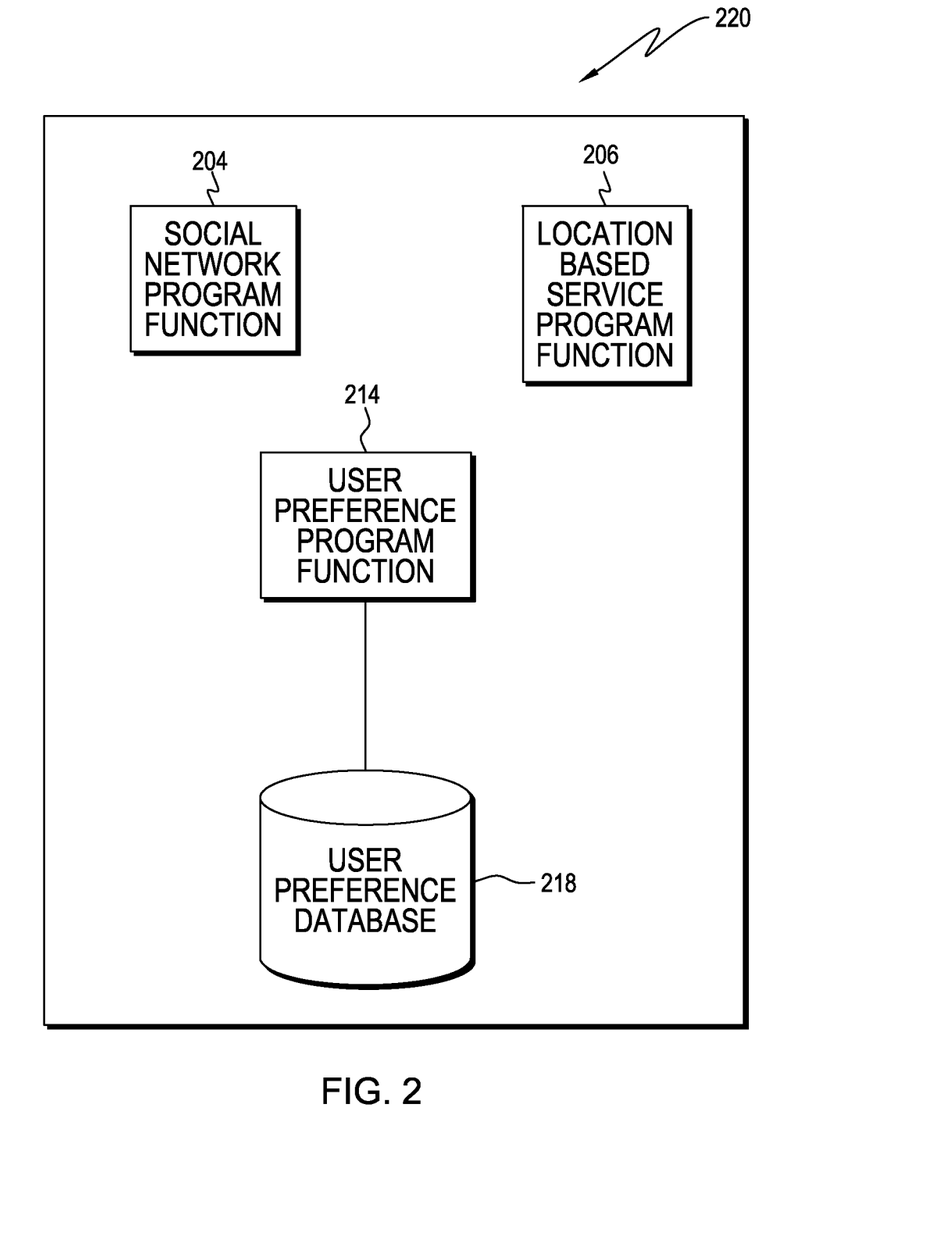
FIG. 2 illustrates program functions of a telephone according to an illustrative embodiment of the invention.

FIG. 2 illustrates program functions of contact status program 220 according to an illustrative embodiment of the invention. The term "program function" is used herein to refer to any portion of a computer program that defines a task or goal, and includes within its scope, for example, code modules and other groups of sequential lines of code, an object or object method in an object-oriented program, and sub-programs that may be defined by a programming language and referred to in the narrower context of that programming language as a procedure, function, subroutine or similar term. Contact status program 220 has social network program function 204 for retrieving a contact's availability status from social network program 114. Social network program function 204 may retrieve the contact's availability status from social network program 114 via any suitable means, such as a programming interface. Examples of a programming interface include an application programming interface (API), a web service interface, and a grid service interface. In one example, social network program function 204 may retrieve the contact's availability status from the contact's Facebook profile using the Facebook Graph API.

Social network program function 204 retrieves a contact's availability status to help a caller decide whether to proceed with placing a call to the contact. For example, a caller may decide not to proceed with placing a call to a contact if a contact's social network availability status indicates that the contact is in a current location, such as an office building, where the caller would prefer not disturb the contact. Likewise, a caller may decide not to proceed with placing the call to the contact if the contact's social network availability status indicates that the contact is currently involved in an activity, such as a business meeting, during which the contact would not like to be disturbed.

In an example embodiment, social network program function 204 determines whether an availability status of a contact is relevant for the purpose of a caller determining whether the contact is available to take the call. For example, it may be relevant for a caller to know that a contact's social network availability status indicates that the contact is in a business meeting, while it may be irrelevant for the caller to know that the contact's social network availability status indicates that the contact is available for employment opportunities. Social network program function 204 determines whether an availability status is relevant is relevant for the purpose of a caller determining whether the contact is available to take the call. by comparing text of the availability status to a predefined set of keywords. For example, predefined keywords may include "meeting," "office," and "work." Social network program function 204 may determine that an availability status is relevant when the availability status contains at least one keyword. The predefined sets of keywords may be stored in and accessed from a file or a database, such as user preference database 218.

In an example embodiment, contact status program 220 displays an availability status obtained by social network program function 204 on telephone 102 only if the availability status is relevant for the purpose of a caller determining the contact is available to take the call. In another example, contact status program 220 displays both relevant and irrelevant availability statuses on telephone 102. However, contact status program 220 may distinguish a relevant status from an irrelevant status. For example, contact status program 220 may display a relevant status in a first color and an irrelevant status in a second color.

In an example embodiment, social network program function 204 retrieves a timestamp of a contact's social network availability status via any suitable means, such as a programming interface, and analyzes the timestamp to determine when the contact's availability status was last updated. For example, a caller may desire that contact status program 220 notify the caller of a contact's availability status only if the availability status has been updated on social network program 114 within a certain timeframe. Thus, contact status program 220 may display an availability status on telephone 102 only if the availability status has been updated within the timeframe. Alternatively, contact status program 220 may display an availability status on telephone 102 regardless of when the availability status was last updated. However, contact status program 220 may distinguish an availability status that has been updated within the timeframe with an availability status that has not been updated within the timeframe. For example, contact status program 220 may display on telephone 102 an availability status that has been updated within the timeframe in a first color, but may display on telephone 102 an availability status that has not been updated within the timeframe in a second color.

The predefined timeframe may be stored in and accessed from user preference database 218, for example. In one example, the timeframe may be predefined as a single constant value. In another example, the timeframe may vary depending on the availability status. For example, a business meeting may typically last only for one hour, while a business training workshop may typically last for two hours. Accordingly, an availability status including the keyword "meeting" may be relevant, for the purpose of a caller determining whether the contact is available to take the call, only for one hour while an availability status including the keywords "training workshop" may be relevant, for the purpose of a caller determining whether the contact is available to take the call, for two hours. Therefore, a timeframe may be predefined to be one hour for an availability status which includes the keyword "meeting," while the timeframe may be predefined to be two hours for an availability status which includes the keywords "training workshop." In one example, social network program function 204 may dynamically determine the timeframe, based on the availability status, by accessing an external data source. For example, an availability status indicating that a contact is at a movie theatre watching a particular movie is relevant to a caller while the movie is running. Thus, social network program function 204 may access, via network 112, an external data source (for example, a server computer) including running times for movies, and determine the timeframe to be the running time of the movie.

Contact status program 220 has a location based service (LBS) program function 206 for retrieving a contact's current location from LBS provider 116, such as Google Latitude™ or Foursquare®. LBS provider 116 enables a contact to share a current location by updating a central server via a personal computer or a mobile telephone. For example, a contact may "check in" at a location via Foursquare® and share the location with friends or contacts. LBS program function 206 retrieves a contact's current location from LBS provider 116 via any suitable means, such as a programming interface.

The current location retrieved by LBS program function 206 from LBS provider 116 is indicative of the contact's availability status and helps a caller to determine whether or not to proceed with a call to the contact. Specifically, the caller may decide not to proceed with calling the contact after considering that the contact has checked in at a particular office for a business meeting. Furthermore, the caller may or may not choose to proceed with calling the contact, depending on the office that the contact checked in at, if the caller is familiar with the office and also familiar with the contact's typical course of business at the particular office. For example, if a contact checks in at The Office Tower and the caller knows that the contact frequently visits The Office Tower to informally collaborate with a colleague, the caller may chose to proceed with a call to the contact. However, if the caller knows that the contact typically visits The Office Tower to formally meet with an executive of a corporation, for example, the caller may decide not to bother the contact with a call while the contact is in The Office Tower.

In an example embodiment, LBS program function 206 may analyze a timestamp of a contact's last update to his or her location on LBS provider 116. For example, a caller may desire that contact status program 220 notify the caller of a contact's LBS location only if the location has been updated within a certain timeframe on LBS provider 116. Thus, contact status program 220 may display on telephone 102 a location updated via LBS 116 only if the location has been updated within the timeframe. Alternatively, contact status program 220 may display on telephone 102 the location regardless of when the location was last updated. However, contact status program 220 may distinguish a location that has been updated within the timeframe with a location that has not been updated within the timeframe. For example, contact status program 220 may display on telephone 102 a location that has been updated within the timeframe in a first color, but may display on telephone 102 a location that has not been updated within the timeframe in a second color. The predefined timeframe may be stored in and accessed from user preference database 218, for example.

Contact status program 220 has a user preference program function 214 for prioritizing the different methods of social network program function 204 and LBS program function 206 for retrieving status information about a contact. For example, a caller may know that a specific contact may not update LBS provider 116 each time that the specific contact changes his or her location. Thus, the caller may prefer to rely on social network function 204 when determining an availability status of the specific contact, but may prefer to rely on LBS program function 206 when determining an availability status of other contacts. Accordingly, the caller may define how telephone 102 determines an availability status of a contact.

User preference program function 214 also enables a user to define keywords to be used by social network program function 204 to determine whether an availability status is relevant for the purpose of a caller determining whether a contact is available to take a call. User preference program function 214 also enables a user to define the predefined timeframes to be used by social network program function 204 and LBS program function 206 to determine whether an availability status or a location is up-to-date.

Contact status program 220 has user preference database 218 to store a caller's preferences, obtained by user preference program function 214, for how to obtain a contact's availability status information. User preference database 218 may store one set of preferences, applicable to all contacts. User preference database 218 may also store preferences according to individual contacts or groups of contacts. For example, a caller may choose to give higher priority to LBS program function 206 for obtaining an availability status of a business contact while choosing to give a higher priority to social network program function 204 for obtaining an availability status of a personal contact. Thus, a caller may rank the various methods for obtaining a contact's availability status according to the caller's preference. The user may include any number of methods for obtaining a contact's availability status in the rankings. In one example, if contact status program 220 is unable to obtain a contact's availability status via the user's top ranked method, contact status program 220 uses the user's next highest ranked method. If contact status program 220 is unsuccessful at obtaining the contact's availability status via the user's next highest ranked method, contact status program 220 checks each next highest ranked method until the earlier of contact status program 220 obtaining the contact's availability status or contact status program 220 checking all of the prioritized methods. In one example, if the user does not rank any methods or if contact status program 220 is unable to obtain a contact's availability status, contact status program 220 uses a default availability status. Alternatively, in one example, contact status program 220 may generate a warning prior to placing a call to a contact, indicating that the contact's availability status is not known.

Contact status program 220 has a status selection program function 208 to select availability status information obtained by one of social network program function 204 and LBS program function 206, based on preferences stored in user preference database 218, to determine the availability status of a contact.

While in FIG. 2, social network program function 204, LBS program function 206, status selection program function 208, and user preference program function 214, as well as user preference database 218 are shown as integrated within contact status program 220, one of skill in the art will appreciate that, in other embodiments, all of some of social network program function 204, LBS program function 206, status selection program function 208, and user preference program function 214, as well as user preference database 218 are not integrated within, but communicate with, contact status program 220. One of skill in the art will further appreciate that, in another embodiment, social network program function 204, LBS program function 206, status selection program function 208, and user preference program function 214 are standalone computer programs on telephone 102.

It should be understood that although the example embodiments herein are described using business meetings and other similar activities as an example status, any type of status may be used to help a caller determine whether to proceed with placing a call to a contact.

Figure 3:
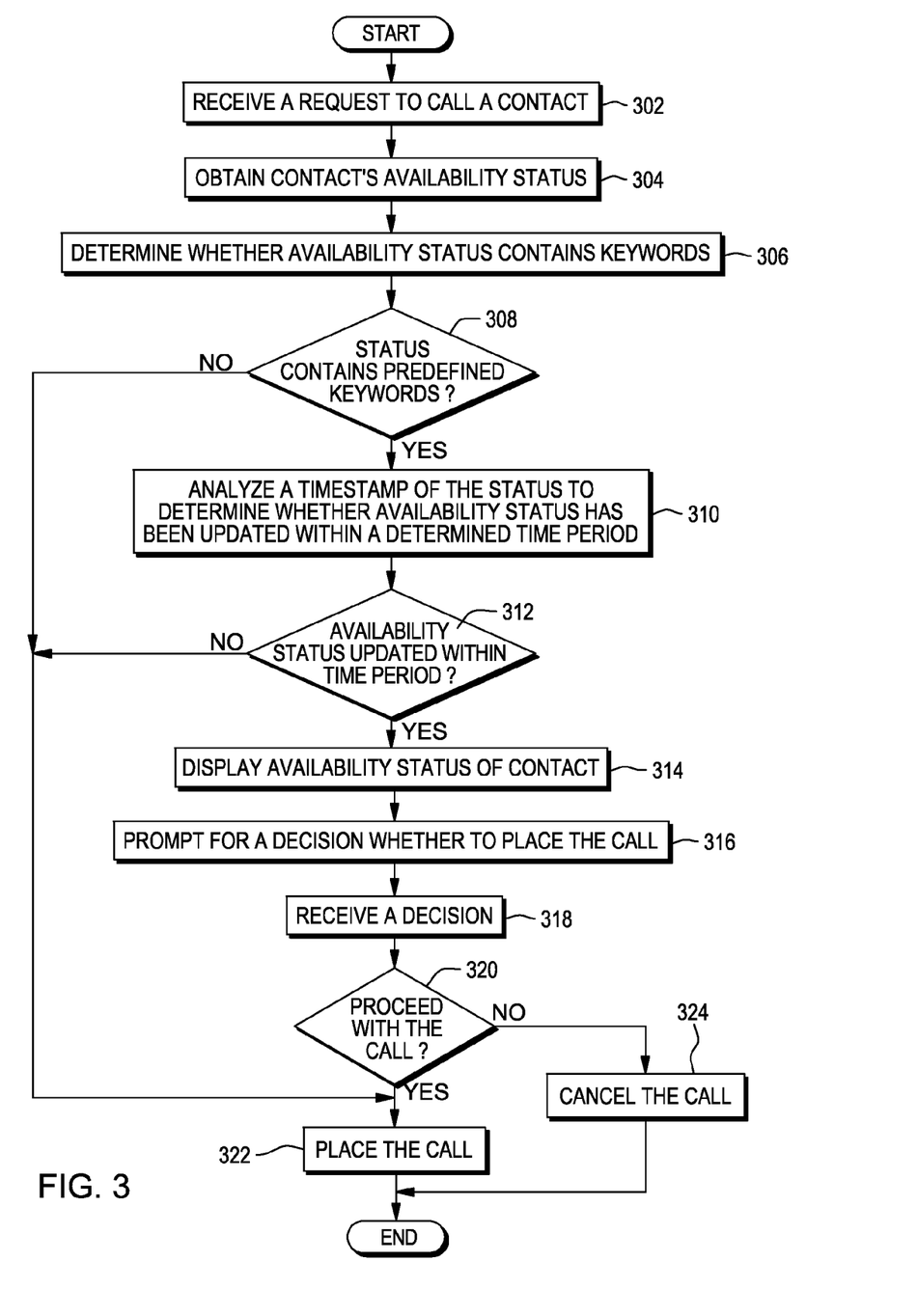
FIG. 3 is a flow chart of a method for determining an availability status of a contact associated with a target telephone when placing a call from a telephone to the target telephone, according to an illustrative embodiment of the invention.

FIG. 3 is a flow chart of a method for determining an availability status of a contact associated with target telephone 110 when placing a call from telephone 102 to target telephone 110, according to an illustrative embodiment of the invention. At step 302, contact status program 220 receives a request to call a contact. At step 304, contact status program 220 obtains the contact's availability status. Contact status program 220 may obtain a contact's availability status from social network program 114, from LBS provider 116, or from other similar sources, according to priority defined by a caller. For example, a caller may rank social network program 114 as a highest-ranked source as compared to LBS provider 116. Thus, contact status program 220 accesses the highest-ranked source first. In one example, if contact status program 220 is unable to obtain a contact's availability status from the highest-ranked source, contact status program 220 proceeds to access the next highest-ranked source to obtain the contact's availability status. If contact status program 220 is unsuccessful at obtaining the contact's availability status via the next highest-ranked source, contact status program 220 checks each next highest-ranked source until the earlier of contact status program 220 obtaining the contact's availability status or contact status program 220 checking all of the prioritized sources. In one example, no sources are ranked or if contact status program 220 is unable to obtain a contact's availability status, contact status program 220 uses a default availability status. In another example, contact status program 220 may notify the caller that contact status program 220 was not able to obtain an availability status and then proceed to block 316.

At step 306, contact status program 220 determines whether the contact's availability status is relevant to a caller with regard to the caller determining whether the contact is available to take the call. Contact status program 220 determines whether the availability status is relevant by determining whether the availability status contains one or more predefined keywords. If contact status program 220 determines that the availability status does not contain any predefined keywords (decision 308, no branch), then contact status program 220 proceeds with directing telephone 102 to place the call at step 322. In an example embodiment, if contact status program 220 determines that the availability status does not contain any predefined keywords, contact status program 220 may notify the caller that contact status program 220 was not able to obtain a relevant status and then proceed to block 316. In another example embodiment, if contact status program 220 determines that the availability status does not contain any predefined keywords, contact status program 220 may access one or more next-highest ranked sources until the earlier of contact status program 220 obtaining a relevant availability status or checking all sources without obtaining a relevant availability status.

If contact status program 220 determines that the availability status does contain at least one predefined keyword (decision 308, yes branch), then contact status program 220 retrieves a timestamp of the availability status from social network program 114, from LBS provider 116, or form other similar sources, via any suitable means, such as a programming interface, and analyzes the timestamp to determine whether the availability status has been updated within a determined time period, at step 310. If contact status program 220 determines that the availability status has not been updated within a determined time period (decision 312, no branch), then contact status program 220 proceeds with directing telephone 102 to place the call at step 322. In an example embodiment, contact status program 220 may notify the caller that contact status program 220 was not able to obtain a recent availability status and may prompt the caller for a decision whether to proceed with the call. In one example, contact status program 220 may attempt to obtain a more recent availability status from one or more next-highest ranked sources before prompting the caller for a decision.

If contact status program 220 determines that the availability status has been updated within a determined time period (decision 312, yes branch), then contact status program 220 displays the availability status on telephone 102 at step 314. At step 316, contact status program 220 prompts a caller for a decision whether to continue to place the call to the contact. The prompt includes an option to cancel the call if the caller should decide not to call the contact, based on the displayed status of the contact.

At step 318, contact status program 220 receives a decision in response to the prompt given at step 316. A caller makes a decision by pressing either continue button 126 or cancel button 128.

If contact status program 220 receives a decision from a caller to proceed with the call (decision 320, yes branch), then contact status program 220 directs telephone 102 to place the call to the contact at step 322. If contact status program 220 receives a decision from a caller not to proceed with the call (decision 320, no branch), then contact status program 220 cancels the call at step 324.

Figure 4:
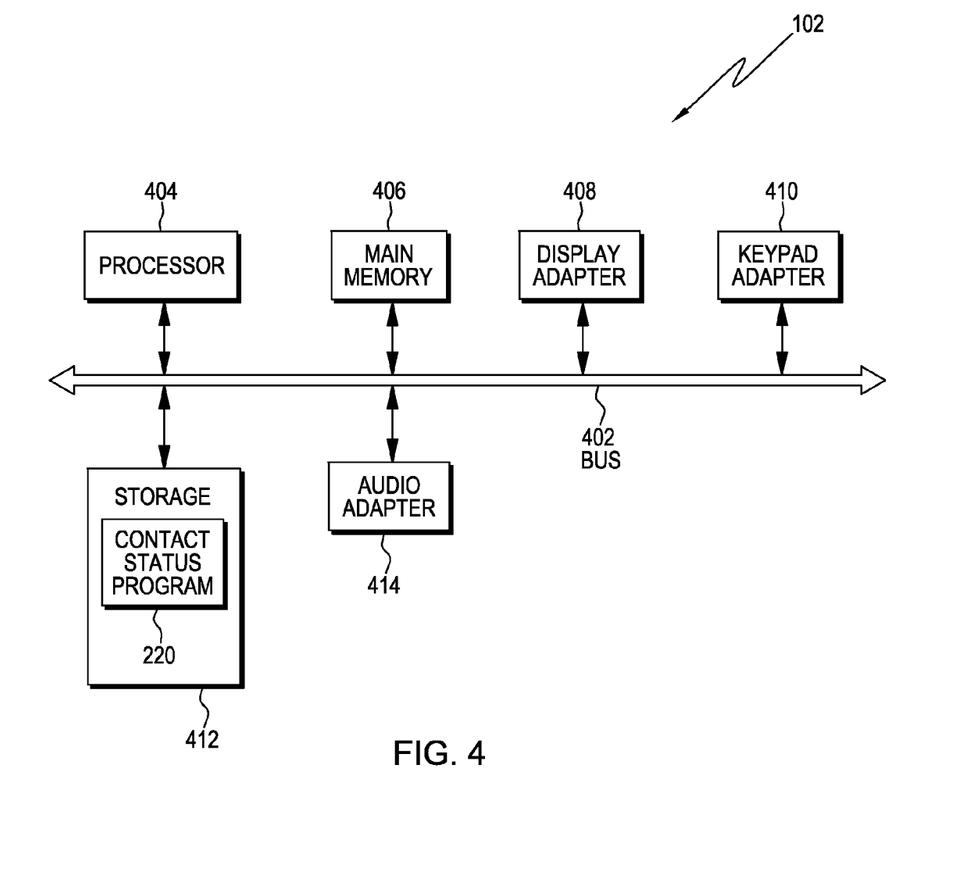
FIG. 4 is a block diagram of a telephone according to an illustrative embodiment of the invention.

FIG. 4 is a block diagram of telephone 102 according to an illustrative embodiment of the invention. Telephone 102 includes a bus 402 to which a processor 404 and a main memory 406 are connected. A display adapter 408, a keypad adapter 410, storage 412, and an audio adapter 414 also are connected to bus 402. Further, display adapter 408 also includes a mechanism to receive user input when a touch screen display is employed.

An operating system runs on processor 404 and is used to coordinate and provide control of various components within telephone 102 in FIG. 4. The operating system may be, for example, a commercially available operating system such as Windows Mobile, Apple iOS, or Blackberry OS. Instructions for the operating system, applications, or programs such as contact status program 220 may be located on one or more computer readable storage devices, such as storage 412, for execution by one or more processors, such as processor 404, via one or more computer readable memories, such as main memory 406. Contact status program 220 can implement processes of exemplary embodiments of the invention.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4.

Figure 5:
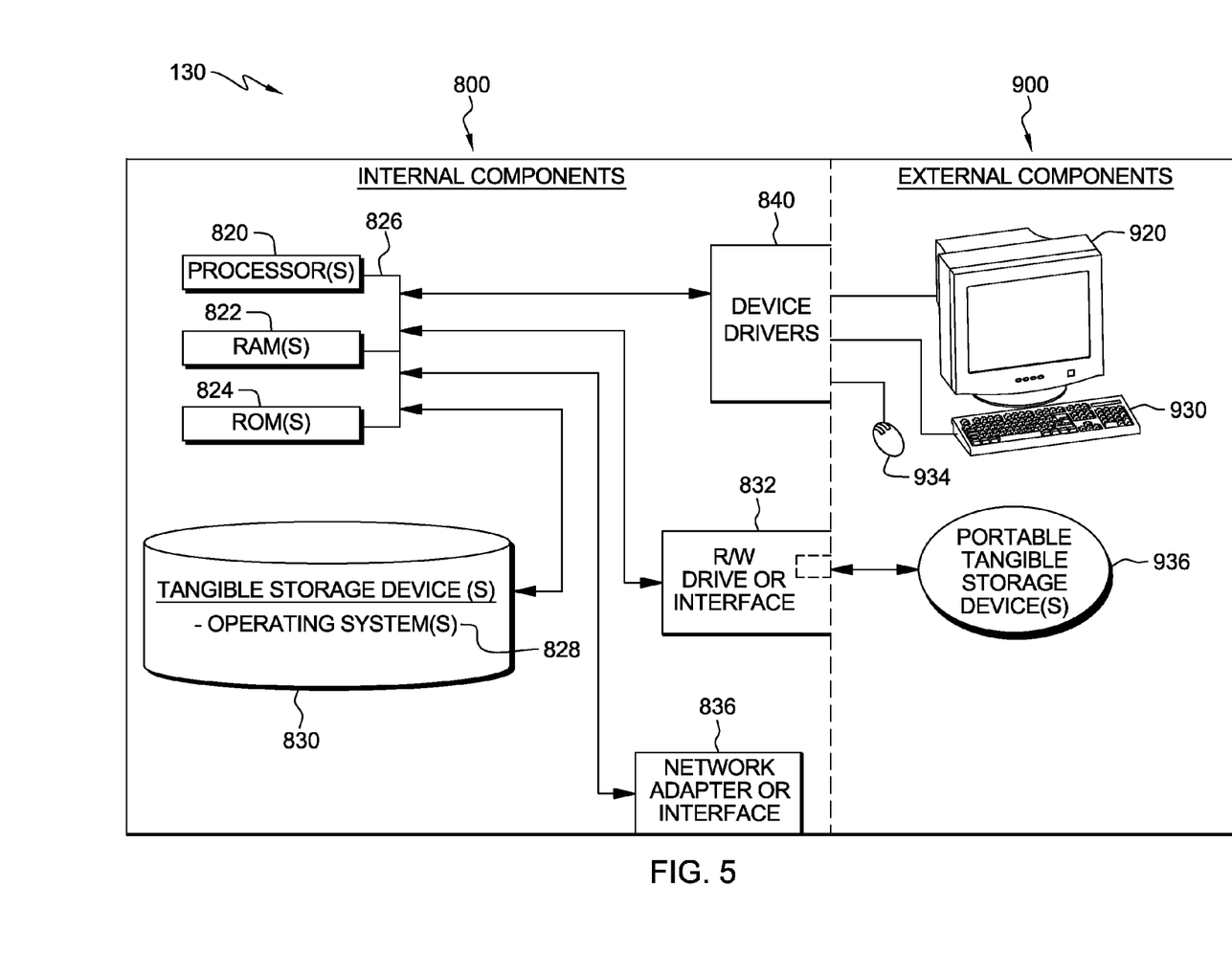
FIG. 5 illustrates hardware and software components of a computer according to an illustrative embodiment of the invention.

FIG. 5 illustrates hardware and software components of computer 130 of FIG. 1. Computer 130 includes internal components 800 and external components 900. Internal components 800 include one or more processors 820, one or more computer-readable RAMs 822 and one or more computer-readable ROMs 824 on one or more buses 826, and one or more guest operating systems 828 and one or more computer-readable tangible storage devices 830. The one or more operating systems 828 and contact status program 220, including social network program function 204, LBS program function 206, status selection program function 208, and user preference program function 214, are stored on at least one or more of the computer-readable tangible storage devices 830 for execution by at least one or more of the processors 820 via at least one or more of the RAMs 822 (which typically include cache memory). User preference database 218 is also stored on at least one or more of the computer-readable tangible storage devices 830. In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. Contact status program 220, including social network program function 204, LBS program function 206, status selection program function 208, and user preference program function 214, can be stored on at least one or more of the portable computer-readable tangible storage devices 936, read via R/W drive or interface 832 and loaded into at least one of one or more computer-readable tangible storage devices 830.

Internal components 800 also include a network adapter or interface 836, such as a TCP/IP adapter card. Contact status program 220, including social network program function 204, LBS program function 206, status selection program function 208, and user preference program function 214, can be downloaded to computer 130 from an external computer via a network (for example, the Internet, a local area network or other, wide area network) and network adapter or interface 836. From the network adapter or interface 836, contact status program 220, including social network program function 204, LBS program function 206, status selection program function 208, and user preference program function 214, are loaded into at least one of one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Contact status program 220, including social network program function 204, LBS program function 206, status selection program function 208, and user preference program function 214, can be written in various programming languages including low-level, high-level, object-oriented or non object-oriented languages. Alternatively, the functions of contact status program 220, including social network program function 204, LBS program function 206, status selection program function 208, and user preference program function 214, can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for placing a telephone call, the method comprising the steps of:
 a first telephone receiving a request to place a call to a second telephone, wherein the second telephone is associated with a contact;
 the first telephone retrieving a user preference for obtaining an availability status of the contact;
 the first telephone obtaining the availability status of the contact from one of a plurality of sources based at least in part on an order of priority of the sources defined by the user preference, wherein the one of the plurality of sources is a social network program operable to access a profile of the contact on a social network, the profile including a current activity of the contact;
 the first telephone determining a time that the availability status was updated;
 the first telephone determining that the time is within a determined timeframe, wherein the time frame is determined by the first telephone dynamically based, at least in part, on the availability status of the contact;
 the first telephone displaying the availability status of the contact, wherein the step of the first telephone displaying the availability status is in response to the step of the first telephone determining that the time is within the determined timeframe; and
 the first telephone prompting for a decision whether to place the call to the second telephone.

2. The method of claim 1, further comprising the steps of:
 the first telephone receiving a decision to continue to place the call; and
 the first telephone placing the call.

3. The method of claim 1, further comprising the step of:
 the first telephone displaying the availability status of the contact in response to the first telephone determining that the availability status comprises at least one of a plurality of predefined keywords.

4. An apparatus comprising one or more processors, one or more computer-readable memories, one or more computer-readable tangible storage devices, and program instructions, stored on at least one of the one or more storage devices for execution by at least one of the one or more processors via at least one of the one or more memories, to implement a method for placing a telephone call, the method comprising:

the at least one of the one or more processors receiving a request to place a call to a telephone associated with a contact;

the at least one of the one or more processors retrieving a user preference for obtaining an availability status of the contact;

the at least one of the one or more processors obtaining the availability status of the contact from one of a plurality of sources based at least in part on an order of priority of the sources defined by the user preference, wherein the one of the plurality of sources is a social network program operable to access a profile of the contact on a social network, the profile including a current activity of the contact;

the at least one of the one or more processors determining a time that the availability status was updated;

the at least one of the one or more processors determining that the time is within a determined timeframe, wherein the timeframe is determined dynamically based, at least in part, on the availability status of the contact;

the at least one of the one or more processors causing display of the availability status of the contact, wherein causing the display of the availability status of the contact is in response to determining that the time is within the determined timeframe; and the at least one of the one or more processors causing display of a prompt for a decision whether to place the call to the telephone.

5. The apparatus of claim 4, the method further comprising:

the at least one of the one or more processors receiving a decision to continue to place the call; and the at least one of the one or more processors placing the call.

6. The apparatus of claim 4, wherein the causing display of the availability status of the contact is in response to determining that the availability status comprises at least one of a plurality of predefined keywords.

7. A computer program product comprising one or more computer readable tangible storage devices and program instructions stored on at least one of the one or more storage devices, said program instructions configured to be executed by at least one of one or more processors of an apparatus to implement a method for placing a telephone call, the method comprising:

the at least one of the one or more processors receiving a request to call a telephone associated with a contact; the at least one of the one or more processors retrieving a user preference for obtaining an availability status of the contact;

the at least one of the one or more processors obtaining the availability status of the contact from one of a plurality of sources based at least in part on an order of priority of the sources defined by the user preference, wherein the one of the plurality of sources is a social network program operable to access a profile of the contact on a social network, the profile including a current activity of the contact;

the at least one of the one or more processors determining a time that the availability status was updated;

the at least one of the one or more processors determining that the time is within a determined timeframe, wherein the timeframe is determined dynamically based, at least in part, on the availability status of the contact;

the at least one of the one or more processors causing display of the availability status of the contact, wherein causing the display of the availability status of the contact is in response to determining that the time is within the determined timeframe; and the at least one of the one or more processors causing display of a prompt for a decision whether to place the call to the telephone.

8. The computer program product of claim 7, wherein the causing display of the availability status of the contact is in response to determining that the availability status comprises at least one of a plurality of predefined keywords.

* * * * *